US006560499B1

(12) United States Patent
Demmer

(10) Patent No.: US 6,560,499 B1
(45) Date of Patent: May 6, 2003

(54) SYSTEM AND METHOD FOR DESIGN AND FABRICATION OF STAMPING DIES FOR MAKING PRECISE DIE BLANKS

(75) Inventor: William A. Demmer, East Lansing, MI (US)

(73) Assignee: Demmer Corporation, Lansing, MI (US)

( * ) Notice: Subject to any disclaimer, the term of this patent is extended or adjusted under 35 U.S.C. 154(b) by 281 days.

(21) Appl. No.: 09/696,324

(22) Filed: Oct. 25, 2000

Related U.S. Application Data

(60) Provisional application No. 60/162,620, filed on Oct. 29, 1999.

(51) Int. Cl.$^7$ .......................... G06F 19/00; B21K 27/06
(52) U.S. Cl. ........................ 700/97; 700/166; 700/182; 72/324
(58) Field of Search .................. 700/95–98, 166; 700/182; 29/465; 72/324

(56) References Cited

U.S. PATENT DOCUMENTS

| | | | | |
|---|---|---|---|---|
| 3,860,803 A | | 1/1975 | Levine | |
| 4,226,143 A | | 10/1980 | Whitecotton et al. | |
| 4,981,061 A | * | 1/1991 | Hillock et al. | 76/107.8 |
| 5,031,483 A | * | 7/1991 | Weaver | 451/5 |
| 5,089,970 A | | 2/1992 | Lee et al. | |
| 5,189,781 A | * | 3/1993 | Weiss et al. | 164/19 |
| 5,249,135 A | * | 9/1993 | Fujita | 700/179 |
| 5,345,052 A | * | 9/1994 | Puddephatt | 219/69.16 |
| 5,402,692 A | * | 4/1995 | Bennett | 219/69.17 |
| 5,463,555 A | | 10/1995 | Ward et al. | |
| 5,566,594 A | | 10/1996 | Michlin | |
| 5,701,251 A | * | 12/1997 | Yoshimura | 345/418 |
| 5,864,482 A | | 1/1999 | Hazama et al. | |
| 5,890,134 A | | 3/1999 | Fox | |
| 5,930,768 A | * | 7/1999 | Hooban | 345/700 |
| RE36,602 E | * | 3/2000 | Sebastian et al. | 700/97 |
| 6,353,768 B1 | * | 3/2002 | Karafillis et al. | 700/145 |
| 6,412,325 B1 | * | 7/2002 | Croswell | 72/324 |
| 6,441,338 B1 | * | 8/2002 | Rabinovich | 219/121.64 |
| 2001/0004003 A1 | * | 6/2001 | Watanabe et al. | 156/251 |

* cited by examiner

Primary Examiner—Leo Picard
Assistant Examiner—Elliot Frank
(74) Attorney, Agent, or Firm—Ian C. McLeod

(57) ABSTRACT

The present invention provides a system and method for a manufacturing operation for fabricating production stamping dies for making precise die blanks wherein the operation is controlled by computer. The method and system produces proposed die blanks from a customer's proposed die blank configuration which are evaluated by the customer before trial and/or production stamping dies are made. In particular, the method provides a computer processing unit, which is accessible to the customer, wherein the computer provides die blank and stamping die CAD/CAM designing and manufacturing capabilities, data storage and retrieval, and coordinates all or particular functions involved in the manufacture of proposed die blanks and trial or production stamping dies.

40 Claims, 2 Drawing Sheets

SYSTEM AND METHOD FOR DESIGN AND FABRICATION OF STAMPING DIES FOR MAKING PRECISE DIE BLANKS

CROSS-REFERENCE TO RELATED APPLICATION

This application is based upon Provisional Application Ser. No. 60/162,620, filed Oct. 29, 1999.

STATEMENT REGARDING FEDERALLY SPONSORED RESEARCH OR DEVELOPMENT

None

BACKGROUND OF THE INVENTION (1) Field of the Invention

The present invention relates to a system and method in a manufacturing operation for fabricating production stamping dies which are used for making precise die blanks wherein the operation is controlled by a computer. The system produces proposed die blanks from a customer's proposed die blank configuration. The proposed die blanks are evaluated by the customer before trial and/or production stamping dies are made. In particular, the method provides a computer processing unit (CPU), which is accessible to the customer, and wherein the CPU provides die blank and stamping die CAD/CAM designing and manufacturing capabilities, data storage and retrieval, and coordinates all or particular functions involved in the manufacture of proposed die blanks and trial or production stamping dies.

(2) Description of Related Art

The manufacture of many three-dimensional shaped products is a two step process. In the first step, a planar sheet of material is cut into a two-dimensional precise die blank by a production stamping die. In the second step, the precise die blank is formed into a three dimensional shape by a shaping die. Many products are made according to this two step process. For example, to make an auto body fender, flat sheet metal is cut into a precise shape (precise die blank) by a production stamping die. The precise die blank is then transferred to a shaping die which forms the precise die blank into the three-dimensional shape of the fender. It is a goal in the design of stamping dies that the precise die blank be of a configuration that when the final shape of the product is formed, the finished product has a minimum of trim which would interfere with the alignment of the shaped product with another shaped product. It is also a goal in the design of stamping dies that the stamping die have a configuration that will produce a maximum number of precise die blanks from a given unit area of the flat sheet material. This conserves material by minimizing the production of low-value scrap. However, achieving these goals can be expensive since (1) several die blank configurations may need to be evaluated before a die blank configuration is found that enables the shaped product to be formed with the minimum amount of trim, and (2) several stamping die configurations may need to be fabricated before a die configuration is found that enables the maximum number of die blanks to be produced from a given unit area of the flat sheet material.

In general, the fabrication of production stamping dies for making precise die blanks is an expensive and time consuming process costing hundreds of thousands of dollars and requiring many months to develop a production stamping die from an estimated design that is suitable for use the production of precise die blanks. The time and expense in making production stamping dies is due to the trial and error nature of the process for designing and making the dies. According to the prior art, a die design, provided by the customer, is made into a steel rule die which is then used to produce die blanks which are tested in the shaping die. Any deficiencies in the die blank configuration are noted, and a corrected steel rule die is fabricated that incorporates the modifications that correct these deficiencies. The corrected rule die is then used to produce die blanks which are again tested in the shaping die. Any deficiencies that did not become manifest in the previous trial are noted and a new corrected steel rule die is fabricated. This trial and error process is repeated until a die blank of the precise configuration is produced. Once a die blank having the precise configuration is produced, a production stamping die is fabricated having the precise configuration necessary to produce the precise die blank. The production stamping die is then used in a limited production run to make sure the production stamping die will function under production conditions. Sometimes during these limited production runs, defects in the design of the production stamping die will become manifest. Therefore, a second production stamping die is then made which incorporates the modifications which are needed to correct the defects. This process for fabricating production stamping dies is expensive because it requires the machining of hardened steels.

In die manufacturing, as in all manufacturing industries, there is constant pressure for greater speed and accuracy in part design. The use of computer-operated machine tools (numerical control machines) provides great savings in machining time and improved accuracy. The related prior art has provided computerized methods for manufacturing processes. Examples include, U.S. Pat. No. 3,860,803 to Levine which provides a method and apparatus for fabricating a progressive die to be used in manufacturing a piecepart; U.S. Pat. No. 5,089,970 to Lee et al. which provides an integrated manufacturing system for managing and distributing information necessary for effecting the production of products in a factory; U.S. Pat. No. 5,463,555 to Ward et al. which provides a system and method for integrating a business environment with a process control environment to make a product specified in a work order; U.S. Pat. No. 5,864,482 to Hazama et al. which provides an apparatus and method for managing and distributing design and manufacturing information throughout a factory in order to facilitate the production of bent sheet metal components; and U.S. Pat. No. 5,890,134 to Fox which discloses a scheduling optimizing algorithm that improves the scheduling capabilites of existing programs for managing the plurality of tasks associated with manufacturing a product such as an aircraft from components. While the aforementioned U.S. Patents use computerized methods for controlling the manufacture of products, none of the aforementioned provide a method for improving the production of stamping dies for producing precise die blanks.

Thus, there remains a need for a method for designing and fabricating stamping dies that produce die blanks which is cost effective and which reduces the amount of time between the initial stamping die design and the final stamping die design. It is preferable that the method minimize the amount of materials and labor used in the process of adapting the initial die design to the final form of the die. Optimally, the method would be a computer-based method that coordinates the entire process for producing a final stamping die from an estimated die design.

SUMMARY OF THE INVENTION

The present invention provides a system and method for a manufacturing operation for fabricating production stamping dies for making precise die blanks wherein the manufacturing operation is controlled by computer. The system and method produces proposed die blanks from a customer's proposed die blank configuration which are evaluated by the customer before trial and/or production stamping dies are made. In particular, the method provides a computer processing unit which is accessible to the customer and wherein the computer provides die blank and stamping die CAD/CAM designing and manufacturing capabilities, and data storage and retrieval, and coordinates all or particular functions involved in the manufacture of proposed die blanks and trial or production stamping dies.

Thus, the present invention provides a method for manufacturing a production stamping die for producing a precise die blank, the steps comprising: (a) receiving a trial configuration of a proposed die blank for producing the production stamping die; (b) producing the proposed die blank from the trial configuration, preferably, wherein the proposed die blank is produced by a cutting method selected from the group consisting of fluid jet cutting, electric wire machining, electrode discharge machining, and electrochemical machining; (c) providing the proposed die blank produced in step (b) for testing in a shaping die; (d) producing a trial stamping die for producing a trial die blank or correcting the proposed die blank configuration based upon the results of the testing wherein the corrected configuration of the proposed die blank is produced and tested as in step (c); (e) providing the trial die blank produced by the trial stamping die for testing in a shaping die in the trial production run; and (f) producing the production stamping die for producing the precise die blank, producing the limited production die for producing the limited production die blank, or correcting the trial stamping die configuration based upon the results of the trial production run wherein the corrected trial stamping die configuration is produced and tested as in step (e).

Therefore, in a manufacturing operation, the present invention provides a system for manufacturing a production stamping die for making a precise die blank from a proposed die blank configuration comprising: (a) producing a proposed die blank from the proposed die blank configuration by a cutting means selected from the group consisting of laser cutting, liquid jet cutting, electrode discharge machining, electric wire machining, electrochemical machining to make the proposed die blank; (b) providing the proposed die blank for testing the proposed die blank configuration in a shaping die; (c) modifying or correcting the configuration of the proposed die blank information based upon the testing of the proposed die blank; (d) producing a trial stamping die from the modified or corrected proposed die blank configuration; (e) providing the trial stamping die for testing in a production run; (f) modifying or correcting the trial stamping die configuration based upon the testing in the production run; (g) producing a production stamping die from the modified or corrected trial stamping die configuration; and (h) providing the production stamping die to produce the precise die blank.

Preferably in the method and system, the customer provides the proposed die blank configuration and modifications to the proposed die blank configuration, trial stamping die, limited production stamping die, and production stamping die by computer access from outside of the manufacturing operation. In particular, wherein the access is by a global worldwide information network, by telephone, by cable or by satellite transmission.

In a preferred embodiment of the method and system, the proposed die blank configuration is produced by a CAD/CAM computer program wherein the program allows modifying or correcting the proposed die blank configuration, the trial stamping die, the limited production stamping die, and the production stamping die. In particular, wherein the CAD/CAM computer program directs production of the proposed die blanks.

Preferably, the method and system further include at least one of providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same. It is further preferable that the method and system include estimating a cost of material for producing, for scheduling, and for shipping of the proposed die blanks or trial production stamping dies, or production of the precise die blanks from the trial or production stamping dies, and for accounting for the same.

The present invention further provides a computerized system in a manufacturing operation for manufacture of production stamping dies used for making a precise die blank which comprises: a central processing unit (CPU) with input and output means which CPU has a program for storing and retrieving information through the input and output means; multiple separate terminals connected to the CPU through the input and output means for retrieving and storing the information from the CPU and for storing information in the CPU so that the information is disseminated within the manufacturing operation. The program enables storing and retrieving information concerning a proposed configuration of a proposed die blank for which production stamping dies are to be produced; storing and retrieving information concerning the configuration and forming of the proposed die blank which is produced in the manufacturing operation from the proposed configuration; storing and retrieving information concerning limited production trial stamping dies enabling production of the proposed die blank or enabling production of corrected stamping dies and a corrected die blank which trial stamping dies have been tested by forming the proposed die blank or the corrected die blank to a final configuration; and storing and retrieving information concerning the manufacture of the production stamping dies for the precise die blank based upon the trial stamping dies or corrected stamping dies, wherein the production stamping dies produce the precise die blank.

The present invention further provides a system wherein a customer has access to the CPU from outside of the manufacturing operation. Preferably, the CPU of the system is accessed by a global worldwide information network, by telephone, by cable, or by satellite transmission. Thus, the present invention further provides a system wherein the proposed die blank information which is stored in the program that enables the storing and retrieving information concerning a proposed configuration of a proposed die blank for which production stamping dies are to be produced is obtained from outside of and independently of the manufacturing operation. The present invention further provides a system wherein the multiple terminals of the system are in separate geographical locations within the manufacturing operation and the CPU is accessed independently by each of the terminals.

Furthermore, the present invention provides a system wherein the proposed die blank configuration is produced by rule die, fluid jet cutting, electric wire machining, electrode discharge machining, or by electrochemical machining and stored in the program for enabling storing and retrieving information concerning the configuration and forming of the proposed die blank which is produced in the manufacturing operation from the proposed configuration. In a preferred embodiment of the present invention, the CPU comprising the system is connected to a CAD/CAM drawing unit for producing drawings and wherein at least one of the multiple terminals is provided with a video screen for viewing the drawings and an input and output keyboard for modifying the drawings with the program.

The present invention further provides a system wherein the program enables at least one of providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same. In a preferred embodiment, the CPU is programmed for each of the aforementioned.

The present invention further still provides a method for the manufacture of production stamping dies used for making a precise die blank by providing a system in a manufacturing operation for the manufacture of production stamping dies used for making the precise die blank which comprises: a central processing unit (CPU) with input and output means which CPU has one or more programs for storing and retrieving information through the input and output means; multiple separate terminals connected to the CPU through the input and output means for retrieving and storing information from the CPU and for storing information in the CPU so that the information is disseminated within the manufacturing operation; the programs enabling storing and retrieving information concerning a trial configuration of a proposed die blank for which production stamping dies are to be produced; storing and retrieving information concerning the configuration of the proposed die blank which is produced in the manufacturing operation from the trial configuration; storing and retrieving information concerning limited production trial stamping dies enabling production of the proposed die blank or enabling production of corrected stamping dies and a corrected die blank which trial stamping dies or corrected stamping dies have been tested by forming the proposed die blank or the corrected die blank to a final configuration; and storing and retrieving information concerning the manufacture of the production stamping dies for the precise die blank based upon the trial stamping dies or corrected stamping dies, wherein the production stamping dies produce the precise die blank; storing in the CPU the proposed die blank information in the program for storing and retrieving information concerning a trial configuration of a proposed die blank for which production stamping dies are to be produced; manufacturing and testing by forming by shaping the proposed die blanks for the program for storing and retrieving information concerning the configuration of the proposed die blank which is produced in the manufacturing operation from the trial configuration; storing the information of the manufacturing and testing by forming by shaping the proposed die blanks in the program for storing and retrieving information concerning the configuration of the proposed die blank which is produced in the manufacturing operation from the trial configuration; manufacturing and testing by drawing the trial die blank or corrected die blank with the trial stamping dies or corrected stamping dies and modifying the trial or corrected stamping dies as a result of the testing; storing the information concerning the trial or corrected stamping dies and proposed or corrected die blanks in the program for storing and retrieving information concerning limited production trial stamping dies; manufacturing the production stamping dies based upon information concerning the trial stamping dies or corrected stamping dies in the program for storing and retrieving information concerning the manufacture of the production stamping dies for the precise die blank based upon the trial stamping dies or corrected stamping dies; and storing information in the program for storing and retrieving information concerning the manufacture of the production stamping dies for the precise die blank based upon the trial stamping dies or corrected stamping dies.

The present invention further provides a method wherein a customer further accesses the CPU from outside of the manufacturing operation. Preferably, the access is by a global worldwide information network, by telephone, by cable, or by satellite transmission. Thus, the present invention further provides a method wherein the proposed blank information is obtained from outside of and independently of the manufacturing operation in the program enabling storing and retrieving information concerning a trial configuration of a proposed die blank for which production stamping dies are to be produced. The present invention also provides a method wherein the multiple terminals are in separate geographical locations within the manufacturing operation and the CPU is accessed independently by each of the terminals.

Further still, the present invention provides a method wherein the die blank is produced by rule die, laser cutting, fluid jet cutting, electric wire machining, electrode discharge machining, or by electrochemical machining and stored in the program for storing and retrieving information concerning the configuration of the proposed die blank which is produced in the manufacturing operation from the trial configuration. In a preferred embodiment of the present invention, the system is connected to a CAD/CAM drawing unit for producing drawings and wherein at least one of the multiple terminals is provided with a video screen for viewing the drawings and an input and output keyboard for modifying the drawings with the program.

The present invention further provides a method wherein the program enables at least one of providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same. In a preferred embodiment, the CPU is programmed for each of the aforementioned.

Finally, the present invention provides a method for manufacturing a production stamping die for making a precise die blank from a proposed die blank configuration in a manufacturing operation comprising: providing a central processing unit (CPU) with input and output means for receiving, storing, and retrieving information comprising the proposed die blank configuration which is provided by a customer wherein the CPU disseminates the information within the manufacturing operation; retrieving the information from the CPU concerning the manufacture of the proposed die blank and using the information to direct a cutting means selected from the group consisting of laser cutting, liquid jet cutting, electrode discharge machining, electric wire machining, electrochemical machining to make the proposed die blank; providing the proposed die blank to the customer who evaluates the proposed die blank configuration; modifying or correcting the configuration of the proposed die blank information stored in the CPU based upon the customer's evaluation of the proposed die blank wherein the modifications or corrections are input into the CPU; using the information comprising the modified or corrected die blank configuration in the CPU to direct the manufacture of a trial stamping die and providing the trial stamping die to the customer for evaluation in a production run; modifying or correcting the configuration of the trial stamping die information stored in the CPU based upon the customer's evaluation of the trial stamping die in a production run wherein the modifications or corrections are input into the CPU; and using the information comprising the modified or corrected die blank configuration in the CPU to direct the manufacture of a production stamping die and providing the production stamping die to the customer.

The present invention further provides that the customer accesses the CPU from outside the manufacturing operation wherein the access is by a global worldwide information network, by telephone, by cable, or by satellite. The present invention also provides that the CPU comprises multiple terminals which are in separate geographic locations within the manufacturing operation and the CPU is accessed independently by each of the terminals. In a preferred embodiment of the present invention, the system is connected to a CAD/CAM drawing unit for producing the drawings and wherein at least one of the multiple terminals is provided with a video screen for viewing the drawings and an input and output keyboard for modifying the drawings with the program.

The present invention provides that the system enables at least one of estimating a cost of the production, estimating a cost of material for producing, estimating a cost of the scheduling for production or for shipping of the proposed or trial die blanks, or trial or production stamping dies, or corrected proposed or trial die blanks, or corrected trial or production stamping dies, and for accounting for the same. In particular, wherein the CPU is programmed for each of providing a final or estimated cost of material for producing, for scheduling, and for shipping of the proposed die blanks or trial or production stamping dies, or production of the corrected or precise die blanks from the trial or production stamping dies, and for accounting for the same.

Therefore, it is a general object of the present invention to provide a system and method that facilitates the fabrication of a production stamping die from a proposed die blank configuration wherein the production stamping die produces a precise die blank having a precise configuration.

It is a further object of the present invention to provide a system and method that reduces the time and cost needed to fabricate a production stamping die wherein the production stamping die produces a precise die blank that is of the precise specifications needed to produce a formed part with a minimum of trim.

It is another object of the present invention to provide a system and method for storing both the stamping die design and manufacturing information for a customer's die blank configuration, so that the information may be easily accessed and retrieved from any area in a manufacturing area or by the customer from a remote location for either directing the manufacture of the proposed die blank or the trial or production stamping die or modification of the proposed die blank configuration.

Yet another object of the present invention is to provide a system and method that facilitates the development of a production stamping die configuration to produce a precise die blank by providing a proposed die blank for evaluation by a customer without committing to a die design until after the proposed die blanks have been evaluated by the customer and corrections and/or modifications to the proposed die blank configuration have been determined.

Still another object of the present invention is to provide a system and method for fabricating a production stamping die from a proposed die blank configuration provided by a customer in a project wherein management of the project is by a computer processing unit which coordinates design and manufacturing aspects of the project which comprises estimating time and costs for the project, scheduling of the project, procurement of materials for the project, shipping of die blanks and stamping dies produced by the project to the customer, and accounting for the project.

These and other objects will become increasingly clear with reference to the drawings and the description of the preferred embodiments.

DESCRIPTION OF PREFERRED EMBODIMENTS

Figure 1:
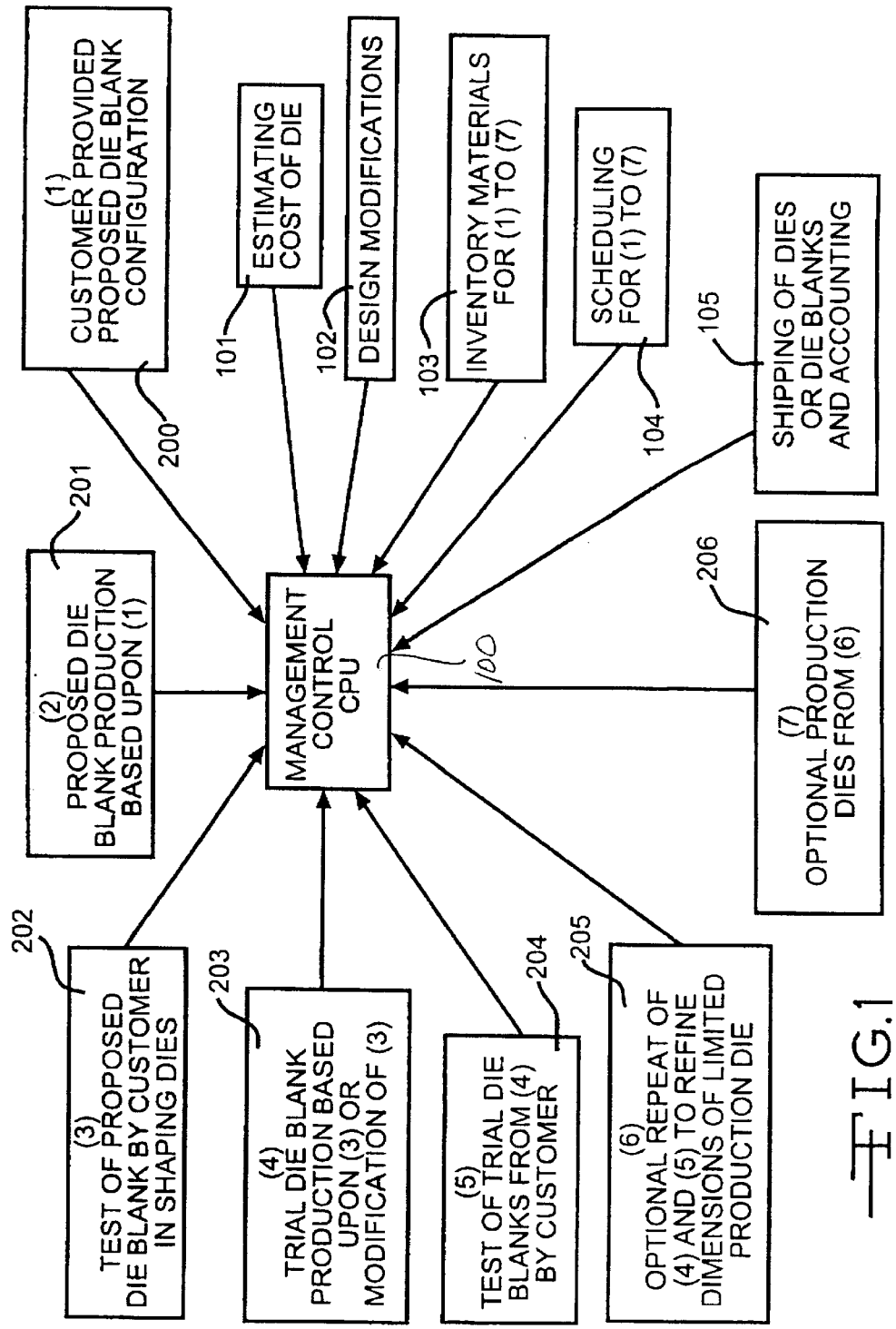
FIG. 1 is a flow diagram showing the steps and operations defining a preferred embodiment of the system that incorporates the novel steps or algorithm characterizing the invention.

To facilitate an understanding of the present invention the following terms as they are used herein are defined.

A "precise die blank" is flat planar sheet of material that has been cut by a production stamping die into a defined two-dimensional shape which is then shaped into a three-dimensional form in a shaping die.

A "production stamping die" consists of a cutter and a punch which is used in a press to punch out a die blank from a sheet of material.

A "trial stamping die" is a die similar in function to a production stamping die except that the die is made of less costly materials and has a limited production run life span. A trial stamping die is usually a steel rule die or a thin die.

A "trial die blank" is a blank produced by the trial stamping die which has a configuration similar to the configuration of its corresponding precise die blank.

A "proposed die blank" is a blank which has a configuration similar to its corresponding precise die blank; however, a proposed die blank is made by a non-die cutting method such as laser cutting, liquid jet cutting, electric wire machining, electrode discharge machining, or electrochemical machining.

The present invention improves the process for designing a production stamping (or tool) die that is used to produce a two-dimensional die blank of a precise shape which is then formed into a three-dimensional shape by a shaping die. In particular, the present invention integrates several phases in the fabrication of production stamping dies into a system and method for developing and then making production dies at low cost. In the method and system, the development and fabrication of a production stamping die has four phases.

In phase 1, a proposed die blank is made by a non-die method from a proposed die blank design provided by the customer. Preferably the proposed die blank design is provided in a digitized format. The proposed die blanks produced according to the proposed die blank design are provided to the customer in several related configurations or prototypes, and the customer tries out and evaluates each of the blank configurations in the customer's stamping die. The non-die method for producing proposed die blanks can be laser cutting, fluid jet cutting, electric wire machining, electrode discharge machining (EDM), or by electrochemical machining (ECM). Laser cutting supports prototype development and tryout development and is suitable for low quantity production of about 1 to 25 blanks for tryout by the customer. Liquid jet cutting supports prototype development and tryout development and is suitable for producing about 25 to 50 blanks for tryout by the customer. This phase allows multiple die blank configurations to be evaluated without the expense of fabricating steel rule dies to produce each blank configuration. Changes in the die's configuration that become apparent during the tryout are relayed to the die manufacturer who produces proposed die blanks having the corrected configuration.

In phase 2, a low-cost trial stamping die is fabricated that will produce a trial die blank having the die blank configuration selected by the customer in phase 1. The low-cost trial stamping die can be a steel rule die, a bump tool die, or a thin die. Steel rule dies are low cost dies that support either prototype development or tryout development and are capable of producing trial die blanks in a low volume production run of between about 25 and 10,000 trial die blanks. Bump dies which support prototype development through pilot production are suitable for medium to high volume production runs of low complexity parts. Thin dies support all phases of development and are suitable for high volume production runs of low to high complexity parts. These low cost stamping dies are evaluated by the customer in tryouts that evaluate the trial blanks in the customer's stamping dies. Any changes in die configuration required by the customer are relayed by the customer to the die manufacturer and a redesigned or corrected low cost trial stamping die is provided to the customer.

In a preferred embodiment, the low cost trial stamping die is a thin die which is made using the corrected die blank configuration provided by the customer. While a thin die, like a steel rule die, is less costly to fabricate than a production stamping die, a thin die, unlike a steel rule die, can also be used as a limited production stamping die which can produce upwards of 60,000 die blanks. The quality of die blanks produced by a thin die is of the same quality as precise die blanks produced by a production stamping die. Thus, a thin die can be used in lieu of a production stamping die when the customer anticipates that a production run is to be of limited duration.

Phases 3 and 4 include the final construction and development of stamping dies for pilot production runs and original equipment manufacturer (OEM) production runs. The low cost stamping dies, preferably bump dies or thin dies, are evaluated in pilot production runs. The pilot production runs evaluate the production of die blanks and shaping of the die blanks under production conditions. Any final changes required by the customer are incorporated into a redesigned or corrected low cost stamping die which is reevaluated by the customer. When a suitable configuration has been decided upon by the customer, phase 4 begins which is fabrication of the production stamping die. The production stamping die is fabricated according to standardized build procedures.

The system control for the present invention as outlined above, further coordinates seven interrelated functions: (1) CAD driven die blank nesting, (2) ordering/storage, (3) processing of materials, (4) data management, (5) develop blank process, (6) stamping die design, and (7) stamping die construction. CAD driven die blank nesting facilitates stock savings and die blank utilization. Ordering/Storage of material such as coil involves complete material handling, on site material storage, and material verification. Processing of material includes cutting coil to length and further involves the management of all blanks, both rectangle and configured. Data management, which can be provided by a computer system such as the IBM CATIA, controls all aspects involved in the development and fabrication of a production stamping die, such as making proposed die blanks. Develop blank process includes, but is not limited to, making proposed die blanks using laser cutting, water jet cutting, electrochemical machining (ECM), electric wire machining, and electrode discharge machining (EDM); building low cost stamping dies to produce trial die blanks if required by a customer; and supplying all types of proposed and trial die blanks to the customer. Stamping die design is commenced after the final die configuration has been determined in evaluation trials of proposed and/or trial die blanks performed by the customer using customer's shaping dies. Stamping die construction includes fabrication of thin dies or production stamping dies.

The system and method of the present invention can be conducted without using a central computer system; however, it is preferable that the different phases of the method and system each be performed using one or more computers. The computers for any one phase of the system does not need to be linked to any one of the computers involved in another phase of the system. However, it is preferable that the computer for receiving proposed and corrected die blank configurations from the customer be accessible to the customer from a site remote from the production facility. Thus, the customer can access the computer using the Internet, satellite, telephone, or cable. Preferably, the information provided by the customer relating to the proposed die blank configurations is produced by a CAD/CAM program. Information relating to proposed or corrected die blank configurations supplied by the customer is then transferred to a computer which directs the fabrication of the proposed die blank, trial die blank, trial stamping die, limited production stamping die, production stamping die, or modifications thereof. The information received from the customer is also transferred to another computer for estimating a cost of material for producing, for scheduling, and for shipping of the proposed die blanks or trial production stamping dies, or production of the precise die blanks from the trial or production stamping dies, and for accounting for the same; and a computer, which may be the same, for providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same.

The present invention can further comprise a central computer or networked personal computers to direct, manage, and coordinate all phases in the fabrication of stamping dies from a proposed die design to fabrication of the final production stamping die. Thus, the central computer or computer network manages and distributes design information to all parts of the manufacturing facility wherein the information is stored in a central database or file server where it can be easily retrieved from any location within the facility or by the customer. The computer also is able to convert the design information provided by the customer into actual code that directs various cutting machinery in the facility to produce proposed die blanks, or directs machinery to produce low cost and production dies. Thus, the computer is the information, processing, storage and retrieval, and project management means that facilitates all aspects of the system and method of the present invention. In particular, the computer is used for receiving data from a customer and translating the data into numerical code which can be retrieved from the computer to direct production of proposed die blanks, trial stamping dies, and production stamping dies. Furthermore, for each customer's project, the computer has storage and retrieval means for any one or more CAD/CAM system technologies used for designing trial and production stamping dies, modifying the design of the dies, and producing the dies; storage and retrieval means for management software programs that provides cost estimates for the project; storage and retrieval means for management software programs for scheduling the project in the facility, for ordering materials to be used in the project, and for inventorying the materials to be used in the project; storage and retrieval means for management software programs for shipping the proposed die blanks, trial stamping dies, and production stamping dies; and storage and retrieval means for management and accounting software programs for managing and accounting for the project.

Regardless of which embodiment of the present invention is used, it is preferable that the access to the system by the customer be regulated. Thus, a security program, which includes computer virus protection, or a remote computer security service is provided which prevents a customer or unauthorized persons from electronically entering the data banks of the system without the appropriate authorization. Thus, entry into the system is controlled to prevent damage by unauthorized persons.

While the description of the preferred embodiments of the present invention disclosed herein relate to stamping dies, the present invention is not to be construed as being limited only to the fabrication of stamping dies. The method of the present invention is also useful for the fabrication of other kinds of production dies such as drop through dies; compound blank and pierce dies; pierce, notch, and cutoff dies; and progressive, pierce, notch, pilot, and blank through blank dies.

FIG. 1 is a diagram showing the method or system of the present invention for fabricating production stamping dies for producing precise die blanks which are used in shaping dies to form the final shaped product. Each element or function of the present invention is integrated into the CPU 100. The CPU is preferably part of a computer system with screens for storage and retrieval of information necessary for (1) estimating production costs and times for completion of the project 101, (2) the design of blanks and dies of the project including modifications and/or corrections of blank and die designs 102, (3) purchasing materials for the project and coordinating delivery, inventory, and use of materials for the project 103, (4) project planning and scheduling the project 104, and (5) shipping the proposed die blanks for testing in the customer's stamping dies, shipping the trial stamping dies for producing die blanks, and shipping the production stamping dies for producing the precise die blanks 105.

The above functions facilitate the steps of the present invention involved in producing a production stamping die for making precise die blanks from a proposed die blank configuration provided by the customer. This is also shown in FIG. 1 which shows that information concerning a customer's proposed die blank configuration 200 is input into the CPU 100 where the information is retrieved and converted into a cutter program which directs cutting machinery to cut the material into proposed die blanks 201. The proposed die blanks are then tested by the customer in shaping dies wherein any information concerning modifications or corrections required as a result of the testing 202 is input into the CPU 100. This information provided by the customer as a result of the testing 202 is retrieved and converted into code that enables fabrication of limited production trial stamping dies 203 which produce trial die blanks that are then tested by the customer in a limited production run 204. Information from the results of the limited production run 204 is then input into the CPU 100. Optionally, the information from the limited production run 204 can be retrieved from the CPU 100 and steps involving fabrication of limited production trial stamping dies 203 and testing in a limited production run 204 can be repeated to refine the dimensions of the limited production die 205 and this information is input into the CPU 100. Afterwards, depending on whether high output production dies are needed, the information from either the limited production run 204 or the optional 205 is retrieved from the CPU 100 and converted into code that enables fabrication of production dies 206.

The computer system of the present invention is connected to a communication network which provides access to the CPU 100 for purposes of providing die blank configurations and corrected die blank configurations by floppy disk, tape, compact disk (CD), a global information network (e.g., the Internet, Ethernet, Local Area Network (LAN), or equivalent), by RF transmission or by infrared transmission, by optical transmission, by telephone, by cable, or by satellite transmission.

The computer system can be a stand alone personal computer or a general purpose computer that is part of an interface device of the equipment or machinery provided at the location. For example, the computer can be an IBM compatible personal computer which can further comprise a server module and personal computers networked to the server from remote locations, a computer which is part of an interface/control system of an apparatus used to make the die blanks or dies which can further be networked to a personal computer or server module, or a mainframe computer wherein access to the mainframe computer is provided by a plurality of remote terminals and which be further networked to a personal computer or server module. An example is the IBM CATIA system with work stations. Any of the above computer systems can further comprise one or more video display terminals and input/output means for interfacing and controlling the display information which can comprise a keyboard, a mouse device, and/or a joystick device, or equivalent.

The software/hardware in the computer system includes a database and the appropriate CAD/CAM system technology comprising CAD, CAM, or CAD/CAM software, data management software, and manufacturing management software. The CAD/CAM system technology provides drawing capabilities to the present invention which enables digital images of die blanks and trial or production dies to be modified or corrected. By way of non-limiting example, the CAD/CAM system technology can include SMARTCAM, a CAM system (3-D); SOLUTION 3000, a CAD/CAM system (3-D); CIMLINE, a CAD/CAM system (3-D) with 5-axis tool path; CISIGRAPH, a 3-D program with 5-axis tool path; IBM CATIA version 4.1.7, a CAD/CAM system (3-D) with 5-axis tool path; 2-D and 3-D, drafting programs; UNIGRAPHICS, version 11.12; and (2) SEAT OF WORK NC, a CAM system (3-D). Other examples of CAD/CAM system technologies suitable for practicing the present invention are AUTOCAD or CADKEY, or an Amada AP40 or AP60 CAD/CAM system available from Amada America, Inc., Buena Park, Calif. In addition, other CAD systems can include VELLUM, which is a windows-based CAD system available from Ashlar Inc. The system of the present invention further provides programs for advance surfacing, IGES translation, 3-through 5-axis tool paths, and surface imaging. The computer comprising the system and method of the present invention further provides suitable software for interfacing with a communication network. Various data formats such as Structured Query Language (SQL) can be used for accessing or storing data to the database. Examples of other computer system configurations and computer programs which may be useful in practicing the present invention are disclosed in U.S. Pat. No. 5,864,482 to Hazama et al. which is hereby incorporated herein by reference.

Thus, for designing proposed die blanks, trial stamping dies, and production stamping dies according to the system and method of the present invention, the CPU 100 comprises appropriate management system software, and any one or more CAD/CAM system technologies. In addition to the above management and CAD/CAM system technologies, the CPU 100 also provides storage in a database of the information concerning die blank configurations provided by a customer, and the CPU 100 allows retrieval from the database of the information by the manufacturing facility for producing a proposed die blank, a trial stamping die, or a production stamping die. The die blank configuration comprising data in a format readable using any one or more CAD/CAM system technologies is converted into code that instructs a numerically controlled apparatus or apparatuses to make a proposed die blank, a trial stamping die, or a production stamping die. The CPU 100 also provides the ability to permit the customer to submit any modifications and corrections to the configuration of the die blank which is stored in the computer database.

A preferred element of the system is that a proposed die configuration is provided to the CPU 100 by the customer by remote access in a digitized numeric shape of the die blank which is then used by the CPU 100 to direct the fabrication of proposed die blanks, trial stamping dies, and production stamping dies. Typically, the customer uses any one or more CAD/CAM system technologies that reverse engineers a three-dimensional digitized numeric shape of a finally shaped product to produce a two-dimensional digitized numeric shape that is to represent the shape of the proposed die blank. The reverse engineering is accomplished by any one of a number of computer software programs well known in the art which takes into account the properties of the material to be formed, and any stresses and/or deformations that will be sustained by the material comprising the precise die blank during final shaping in the shaping die. The system provides customer access to the CPU 100 for purposes of providing die blank configurations and corrected die blank configurations. Thus, the customer provided digitized shape of the die blank 200 is converted by any one or more CAD/CAM system technologies into code which instructs the blank producing machinery to produce proposed die blanks for the customer to test in the customer's shaping dies for making the final shaped product. Because the shape of the die blank is based upon reverse engineering calculations of the desired shaped stamped part, the nature of the materials used for the die blanks, and the complexity of the stamping operation, the die blanks usually need adjustments in their dimensions in order to accurately form the stamped part with a minimum of trim.

The system of the present invention reduces the cost and time needed for making a satisfactory production die because the proposed die blanks are provided to the customer from information comprising the digitized shape of the die blank provided by the customer without requiring fabrication of a low cost stamping die, such as the steel rule die. Thus, a proposed die blank configuration provided by the customer 200 is downloaded into the CPU 100 of the system which provides the basis for producing a small run of proposed die blanks 201 for the customer to try in shaping dies which form the final shaped product. The proposed die blanks are generally produced by laser cutting, fluid jet cutting, electric wire machining, electrode discharge machining, or by electrochemical machining which are all methods well known in the art. These cutting methods involve cutting a sheet of metal in a line defining the blank and requires several minutes to produce each blank. Generally, these cutting methods are too slow to be useful for making precise die blanks for production. Furthermore, the edges of the die blanks produced by these cutting methods is not of the same quality as edges produced by a stamping die. However, these cutting methods produce proposed die blanks of the necessary quality in a very short period of time, much less than the time needed to fabricate a low cost die. Therefore, the method and system allows proposed die blank configurations to be evaluated and corrected within the same time frame needed to fabricate a low-cost trial stamping die. Also, since a low cost trial stamping die is not needed, the proposed die blanks can be produced not only in the precise configuration provided by the customer but also in a series of alternative configurations that are related to the proposed configuration. Therefore, the customer can evaluate several alternative die blank configurations at the same time. This advantage substantially reduces the time and cost involved in the process of fabricating a production stamping die. Furthermore, a significant benefit of producing proposed die blanks by the aforementioned cutting methods is that there is no commitment to a stamping die configuration until after the specifications for the die blank configuration have been finalized as a result of testing in shaping dies. Since the commitment to a stamping die configuration is postponed until after testing of the die blanks having the configuration, the present invention effects a significant reduction in the costs associated with fabricating production stamping dies.

In practicing the present invention, it is customary to provide to the customer with about 10 to 100 of each proposed die blank configuration. Each proposed die blank configuration is tested by the customer in the customer's shaping die. The customer inputs as trial information 202 into the CPU 100 any corrections or modifications to the proposed die blank configuration which became manifest as a result of the customer's tests. Upon approval of a proposed die blank configuration by the customer, low cost trial stamping dies are fabricated and this information 203 is input into the CPU 100. In the CPU, using any one or more CAD/CAM system technologies, directs the fabrication of the trial stamping die. In one embodiment of the present invention, the trial stamping die is a steel rule die which is well known in the art. Methods for making and using steel rule dies are disclosed in U.S. Pat. No. 4,226,143 to Whitecotton et al. and in U.S. Pat. No. 5,566,594 to Michlin which are hereby incorporated herein by reference. While steel rule dies are inexpensive to make, it is preferable that the low-cost trial stamping die be a thin die which was heretofore unknown to those skilled in the art.

Figure 2:
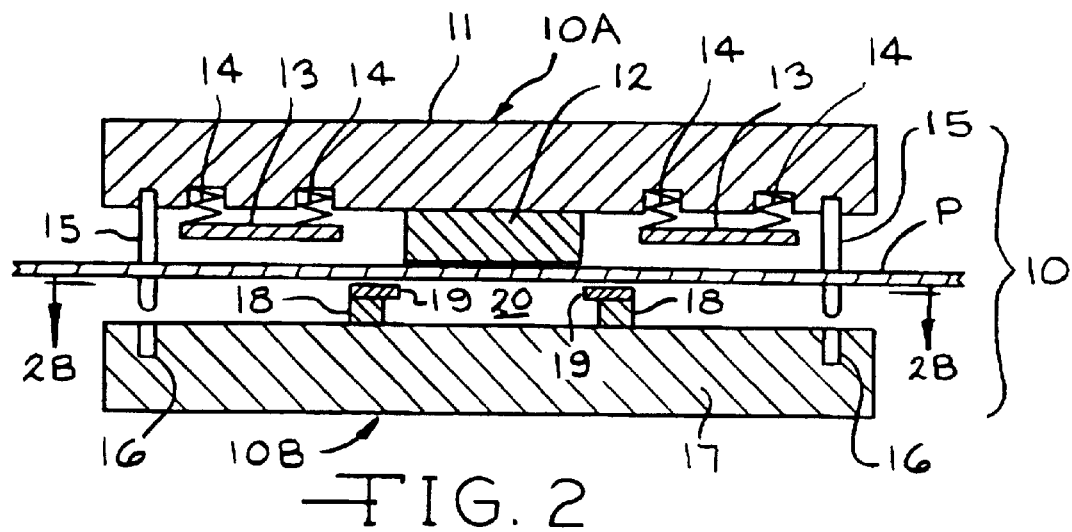
FIG. 2 is a cross-sectional view of the low cost thin die 10 in the open position. The thin die 10 is preferred by the present invention for producing die blanks to produce a substantial quantity of trial die blanks for the customer to test in a limited production capacity in the customer's shaping dies to form the final product.
Figure 2A:
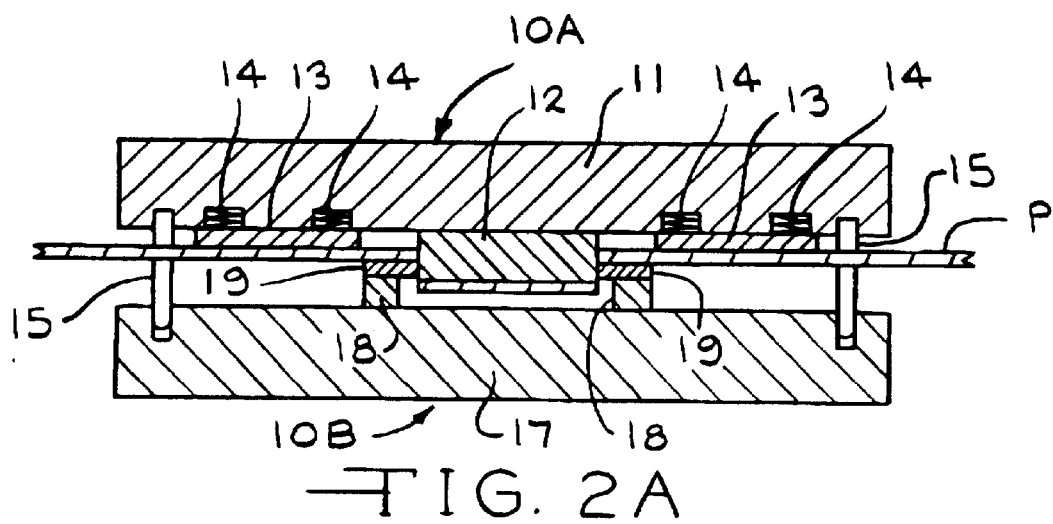
FIG. 2A is a cross-sectional view of the thin die 10 in the closed position.
Figure 2B:
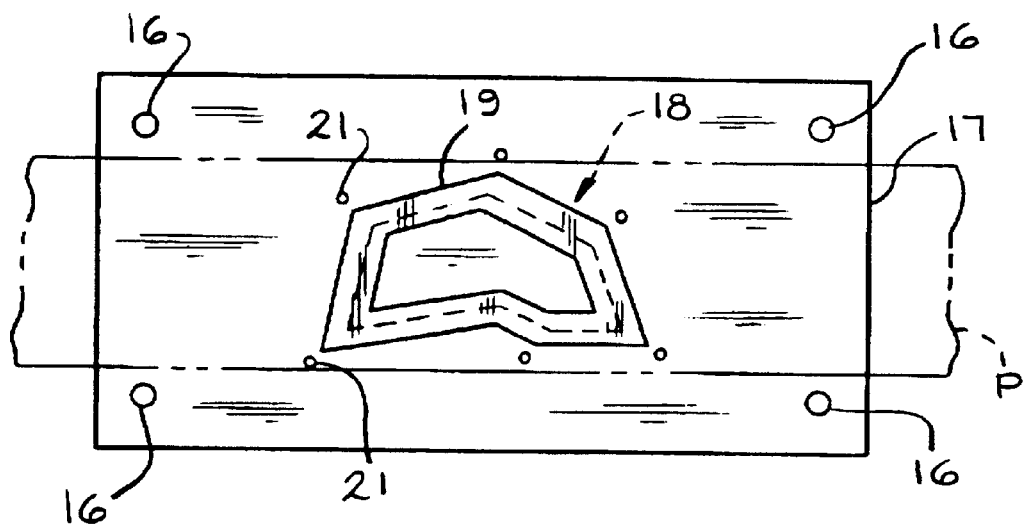
FIG. 2B is plan view of the lower die 10B.

The thin die 10 is fabricated as shown in FIG. 2. The upper die 10A includes a subplate 11, a punch 12, and stoppers 13. The stoppers 13 are moved by coil springs 14 away from the subplate 11 when the thin die 10 is in the open position as shown in FIG. 2. Guide pins 15 are positioned in openings 16 and act to align the upper die 10A with lower die 10B. The lower die 10B preferably includes a subplate 17 made of mild steel resting upon mild steel bar stock supports 18. The supports 18 mount a relatively thin cutter die 19 for the punch 12 to engage as the dies 10A and 10B close as shown in FIG. 2A. FIG. 2B shows the face of die 10B. The opening 20 in subplate 17 conforms to the shape of the punch 12. The thin die 10 can be used for additional production runs after the cutter die 19 has dulled by surface grinding the cutter die 19 or by removing screws 21 and replacing the cutter die 19. The cost of a thin die 10 is greater than a steel rule die; however, the useful life of a thin die 10 is substantially longer than the life of a steel rule die. This is because steel rule dies usually use wood frames which would be incapable of withstanding the repetitive forces that occur during production. Also, because the cost of a thin die 10 is substantially lower (about ⅓ the cost) than the cost of a production stamping die, the thin die 10 is particularly useful for limited production runs between 50 and 60,000 die blanks. The limited run capability of the thin die 10 removes the need to build a production stamping die when the anticipated production run is to be of limited duration. Thus, the thin die 10 can function as a production stamping die once the cutter die 19 and punch 12 are adjusted to the required shape to produce the die blank. Another advantage of the thin die 10 over the steel rule die is that a thin die can be fabricated which consists of multiple cutters 19 and punches 12 arranged in a configuration in the die that enables the maximum number of die blanks of the proper or precise configuration to be produced from a sheet of material P with the least amount of wasted material. Thus, the thin die 10 allows multiple cutter 19 and punch 12 configurations to be evaluated under production conditions at low cost. For these reasons, the thin die 10 is preferred for trial production of die blanks in limited run tests.

FIG. 2 also shows a plate P between subplates 10A and 10B of thin die 10. The plate P can be fed from a coil (not shown), which is preferred, or can be a single plate P. Typically, the cutter die 19 is made of 0.01 inch (0.03 cm) thick steel and overhangs the mild steel by about 0.063 inch (1.60 cm). In a preferred embodiment, the cutter die 19 is flame hardened from hardenable steel such as a high carbon steel which is made from such steel grades that include but are not limited to steels selected from the group consisting of A2, D2, M2, M4, CPM9V, CPM10V, or CMP15V. In contrast, the subplate 17 and support 18 are generally made from a mild steel including any of the hot roll steels, cold rolled steels and other low carbon steels which are not hardened by heat treatment. Mild steels are much softer than hardened steels which makes mild steel easier to cut and/or machine than hardened steel. Thus, the thin die 10 enables the subplate 10B to be made at lower cost than a production stamping die because only a portion of the thin die 10, the cutter 19, need be made from a hardened steel; the rest of the thin die 10 can be made of mild steel which is substantially less costly to machine.

Thus, in the method and system, the CPU 100 has the pivotal role of integrating the various elements comprising the present invention into a single system: the various elements include the proposed die blank specifications produced by any one or more CAD/CAM system technologies and provided by the customer 101, the translation of the proposed die blank specifications by any one or more CAD/CAM system technologies into code that can direct numerically controlled machines to produce proposed die blanks, the incorporation of die blank modification or correction information discovered during evaluation of the proposed die blanks or trial stamping dies into a design for a trial stamping die using any one or more CAD/CAM system technologies, and using any one or more CAD/CAM system technologies that processes the information into numerical code to direct numerically controlled machines to fabricate the trial stamping dies and production stamping dies. Integrated into the computer CPU 100 is a management program that coordinates the scheduling of the project, the procurement of materials need for the project, the shipping schedule for the project, and accounting for tracking receivables and billings related to the project. Thus, the system and method directs the low cost fabrication of proposed die blank configurations based on the customer's design for evaluation by the customer and then integrates information comprising any modifications and corrections to the design required by the customer before a commitment is made as to the final configuration of the production stamping die. Thus, all the parameters surrounding the configuration of a die blank, its production from a stamping die, and its use in a shaping die are evaluated, and any problems in the configuration of the die blank are resolved before any commitment has been made to a particular stamping die configuration. This improvement in the method for producing a production stamping die from a proposed die configuration substantially reduces the time and cost involved in producing the production stamping die.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the Claims attached herein.

I claim:

1. A method for manufacturing a production stamping die for producing a precise die blank for a customer, the steps comprising:

(a) providing a trial configuration of a proposed die blank from the customer for producing the production stamping die in a digitized form in a program in a central processing unit (CPU);

(b) producing multiple of the proposed die blank from the trial configuration using the program in the CPU;

(c) providing the multiple of the proposed die blank produced in step (b) to the customer for testing in a shaping die which deforms the proposed die blanks;

(d) producing (1) a trial stamping die for producing a trial die blank or (2) correcting the proposed die blank configuration based upon the results of the testing wherein the corrected configuration of the proposed die blank is produced and tested as in step (c) and then for producing the trial stamping die;

(e) providing multiple of the trial die blank produced by the trial stamping die for testing in the shaping die in a trial production run by the customer; and (f) producing (1) the production stamping die for producing the precise die blank, (2) producing a limited production stamping die for producing a limited production of the stamping die blank, or (3) correcting the trial stamping die configuration based upon the results of the trial production run, wherein the corrected trial stamping die configuration is produced and tested as in step (e) to produce the production stamping die for the customer.

2. The method of claim 1 wherein the customer provides the proposed die blank configuration and modifications to the proposed die blank configuration, trial stamping die, limited production stamping die, and production stamping die by computer access from outside of the manufacturing operation.

3. The method of claim 2 wherein the access is by a global worldwide information network, by telephone, by cable or by satellite transmission.

4. The method of claim 1 wherein the proposed die blank is produced by a cutting method selected from the group consisting of fluid jet cutting, electric wire machining, electrode discharge machining, and electrochemical machining.

5. The method of claim 1 wherein the proposed die blank configuration is produced by a CAD/CAM computer program wherein the program allows modifying or correcting the proposed die blank configuration, the trial stamping die, the limited production stamping die, and the production stamping die.

6. The method of claim 5 wherein the CAD/CAM computer program directs production of the proposed die blanks.

7. The method of claim 1 wherein the method includes at least one of providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same.

8. The method of claim 1 wherein the method includes estimating a cost of material for producing, for scheduling, and for shipping of the proposed die blanks or trial production stamping dies, or production of the precise die blanks from the trial or production stamping dies, and for accounting for the same.

9. A system for manufacturing a production stamping die for making a precise die blank from a proposed die blank configuration in a manufacturing operation comprising:

(a) providing a proposed die blank from the proposed die blank configuration in a digitized form, in a central processing unit (CPU) which directs a cutting means selected from the group consisting of laser cutting, liquid jet cutting, electrode discharge machining, electric wire machining, and electrochemical machining to make the proposed die blank;

(b) providing multiple of the proposed die blank for testing the proposed die blank configuration in a shaping die which deforms the proposed die blank;

(c) modifying or correcting the configuration of the proposed die blank in the CPU based upon the testing of the proposed die blank;

(d) producing a trial stamping die from the modified or corrected proposed die blank configuration;

(e) providing the trial stamping die for testing in a limited production run by the customer;

(f) modifying or correcting the proposed die blank from the trial stamping die in the CPU based upon the testing in the limited production run; and (g) producing a production stamping die from the modified or corrected trial stamping die configuration wherein the production stamping die is used to produce the precise die blank by the customer.

10. The system of claim 9 wherein a customer provides the proposed die blank configuration and modifications to the proposed die blank configuration, trial stamping die, and production stamping die by computer access from outside of the manufacturing operation.

11. The system of claim 10 wherein the access is by a global worldwide information network, by telephone, by cable, or by satellite.

12. The system of claim 9 wherein a CAD/CAM computer program is used to produce the proposed die blank configuration and to modify or correct the proposed die blank configuration, trial stamping die, and production stamping die.

13. The system of claim 12 wherein the CAD/CAM computer program directs production of the proposed die blanks.

14. The system of claim 9 wherein the method further includes at least one of providing a final or estimated cost of the production, estimating a cost of material for producing, estimating a cost of the scheduling for production or for shipping of the proposed or trial die blanks, or the trial or production stamping dies, or the corrected proposed or trial die blanks, or the corrected trial or production stamping dies, and for accounting for the same.

15. The system of claim 9 wherein the method further includes each of providing a final or estimated cost of material for producing, for scheduling, and for shipping of the proposed die blanks or trial or production stamping dies, or production of the corrected or precise die blanks from the trial or production stamping dies, and for accounting for the same.

16. A system in a manufacturing operation for manufacture of production stamping dies used for making a precise die blank which comprises:

(a) a central processing unit (CPU) with input and output means which CPU has a program for storing and retrieving information through the input and output means;

(b) multiple separate terminals connected to the CPU through the input and output means for retrieving and storing the information from the CPU and for storing information in the CPU so that the information is disseminated within the manufacturing operation;

(c) the program enabling (i) storing and retrieving information concerning a proposed configuration of a proposed die blank for which production stamping dies are to be produced;

(ii) storing and retrieving information concerning the configuration and forming of the proposed die blank which is produced in the manufacturing operation from the proposed configuration;

(iii) storing and retrieving information concerning limited production trial stamping dies enabling production of the proposed die blank or enabling production of corrected stamping dies and a corrected die blank which trial stamping dies have been tested by forming the proposed die blank or the corrected die blank to a final configuration; and (iv) storing and retrieving information concerning the manufacture of the production stamping dies for the precise die blank based upon the trial stamping dies or corrected stamping dies, wherein the production stamping dies produce the precise die blank.

17. The system of claim 16 wherein a customer has access to the CPU from outside of the manufacturing operation.

18. The system of claim 17 wherein the access is by global worldwide information network, by telephone, by cable, or by satellite transmission.

19. The system of any one of claims 16, 17, or 18 wherein the proposed blank information which is stored in the program enabling (c) (i) is obtained from outside of and independently of the manufacturing operation.

20. The system of any one of claims 16, 17, or 18 wherein the multiple terminals are in separate geographical locations within the manufacturing operation and the CPU is accessed independently by each of the terminals.

21. The system of any one of claims 16, 17, or 18 wherein the proposed die blank configuration is produced by trial die, fluid jet cutting, electric wire machining, electrode discharge machining, or by electrochemical machining and stored in the program for (c) (ii).

22. The system of any one of claims 16, 17, or 18 wherein the CPU is connected to a CAD/CAM drawing unit for producing drawings and wherein at least one of the multiple terminals is provided with a video screen for viewing the drawings and an input and output keyboard for modifying the drawings with the program.

23. The system of any one of claims 16, 17, or 18 wherein the program enables at least one of providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same.

24. The system of claim 16 wherein the CPU is programmed for each of estimating a cost of material for producing, for scheduling, and for shipping of the proposed die blanks or production of the trial stamping dies, or production of the precise die blanks from the trial or production stamping dies, and for accounting for the same.

25. A method for the manufacture of production stamping dies used for making a precise die blank:
(a) providing a system in a manufacturing operation for the manufacture of production stamping dies used for making the precise die blank which comprises: a central processing unit (CPU) with input and output means which CPU has a program for storing and retrieving information through the input and output means; multiple separate terminals connected to the CPU through the input and output means for retrieving and storing information from the CPU and for storing information in the CPU so that the information is disseminated within the manufacturing operation; the program enabling (i) storing and retrieving information concerning a trial configuration of a proposed die blank for which production stamping dies are to be produced;

(ii) storing and retrieving information concerning the configuration of the proposed die blank which is produced in the manufacturing operation from the trial configuration;

(iii) storing and retrieving information concerning limited production trial stamping dies enabling production of the proposed die blank or enabling production of corrected stamping dies and a corrected die blank which trial stamping dies or corrected stamping dies have been tested by forming the proposed die blank or the corrected die blank to a final configuration; and (iv) storing and retrieving information concerning the manufacture of the production stamping dies for the precise die blank based upon the trial stamping dies or corrected stamping dies, wherein the production stamping dies produce the precise die blank;

(b) storing in the CPU the proposed die blank information in the program for (a) (i);

(c) manufacturing and testing by forming by shaping the proposed die blanks for (a) (ii);

(d) storing the information of (c) in the program for (a) (ii);

(e) manufacturing and testing by drawing the trial die blank or corrected die blank with the trial stamping dies or corrected stamping dies and modifying the trial or corrected stamping dies as a result of the testing;

(f) storing the information concerning the trial or corrected stamping dies and proposed or corrected die blanks in the program for (a) (iii);

(g) manufacturing the production stamping dies based upon information concerning the trial stamping dies or corrected stamping dies in (a) (iv); and (h) storing information in the program for (a) (iv).

26. The method of claim 25 wherein a customer accesses the CPU from outside of the manufacturing operation.

27. The method of claim 26 wherein the access is by a global worldwide information network, by telephone, by cable or by satellite transmission.

28. The method of any one of claims 25, 26, or 27 wherein the proposed blank information is obtained from outside of and independently of the manufacturing operation in the program enabling (a) (i).

29. The method of any one of claims 25, 26, or 27 wherein the multiple terminals are in separate geographical locations within the manufacturing operation and the CPU is accessed independently by each of the terminals.

30. The method of any one of claims 25, 26, or 27 wherein the die blank that is produced is by trial die, fluid jet cutting, electric wire machining, electrode discharge machining, or by electrochemical machining and stored in the program for (a) (ii).

31. The method of any one of claims 25, 26, or 27 wherein the system is connected to a CAD/CAM drawing unit for producing drawings and wherein at least one of the multiple terminals is provided with a video screen for viewing the drawings and an input and output keyboard for modifying the drawings with the program.

32. The method of any one of claims 25, 26, or 27 wherein the program enables at least one of providing a final or estimated cost of the production, a final or estimated cost of material for producing or scheduling for production of the proposed die blanks or the trial or production stamping dies or shipping of the proposed die blanks or the trial or production stamping dies or production of the corrected proposed die blanks or trial or precise die blanks from the trial or production stamping dies, and for accounting the final or estimated costs for the same.

33. The method of claim 25 wherein the CPU is programmed for each of estimating a cost of material for producing, for scheduling, and for shipping of the proposed die blanks or production of the trial stamping dies, or production of the precise die blanks from the trial or production stamping dies, and for accounting for the same.

34. A method for manufacturing a production stamping die for making a precise die blank from a proposed die blank configuration in a manufacturing operation comprising:

(a) providing a central processing unit (CPU) with input and output means for receiving, storing, and retrieving information comprising the proposed die blank configuration which is provided by a customer wherein the CPU disseminates the information within the manufacturing operation;

(b) retrieving the information from the CPU concerning the manufacture of the proposed die blank and using the information to direct a cutting means selected from the group consisting of laser cutting, liquid jet cutting, electrode discharge machining, electric wire machining, electrochemical machining to make the proposed die blank;

(c) providing the proposed die blank to the customer who evaluates the proposed die blank configuration;

(d) modifying or correcting the configuration of the proposed die blank information stored in the CPU based upon the customer's evaluation of the proposed die blank wherein the modifications or corrections are input into the CPU;

(e) using the information comprising the modified or corrected die blank configuration in the CPU to direct the manufacture of a trial stamping die and providing the trial stamping die to the customer for evaluation in a production run;

(f) modifying or correcting the configuration of the trial stamping die information stored in the CPU based upon the customer's evaluation of the trial stamping die in a production run wherein the modifications or corrections are input into the CPU; and (g) using the information comprising the modified or corrected die blank configuration in the CPU to direct the manufacture of a production stamping die and providing the production stamping die to the customer.

35. The method of claim 34 wherein the customer accesses the CPU from outside the manufacturing operation.

36. The method of claim 35 wherein access to the CPU is by a global worldwide information network, by telephone, by cable, or by satellite.

37. The method of claim 34 wherein the CPU comprises multiple terminals which are in separate geographic locations within the manufacturing operation and the CPU is accessed independently by each of the terminals.

38. The method of claim 34 wherein the system is connected to a CAD/CAM drawing unit for producing the drawings and wherein at least one of the multiple terminals is provided with a video screen for viewing the drawings and an input and output keyboard for modifying the drawings with the program.

39. The method of claim 34 wherein the system enables at least one of providing a final or estimated cost of the production, estimating a cost of material for producing, estimating a cost of the scheduling for production or for shipping of the proposed or trial die blanks, or trial or production stamping dies, or corrected proposed or trial die blanks, or corrected trial or production stamping dies, and for accounting for the same.

40. The method of claim 39 wherein the CPU is programmed for each of providing a final or estimated cost of material for producing, for scheduling, and for shipping of the proposed die blanks or trial or production stamping dies, or production of the corrected or precise die blanks from the trial or production stamping dies, and for accounting for the same.

* * * * *